United States Patent Office 2,944,874
Patented July 12, 1960

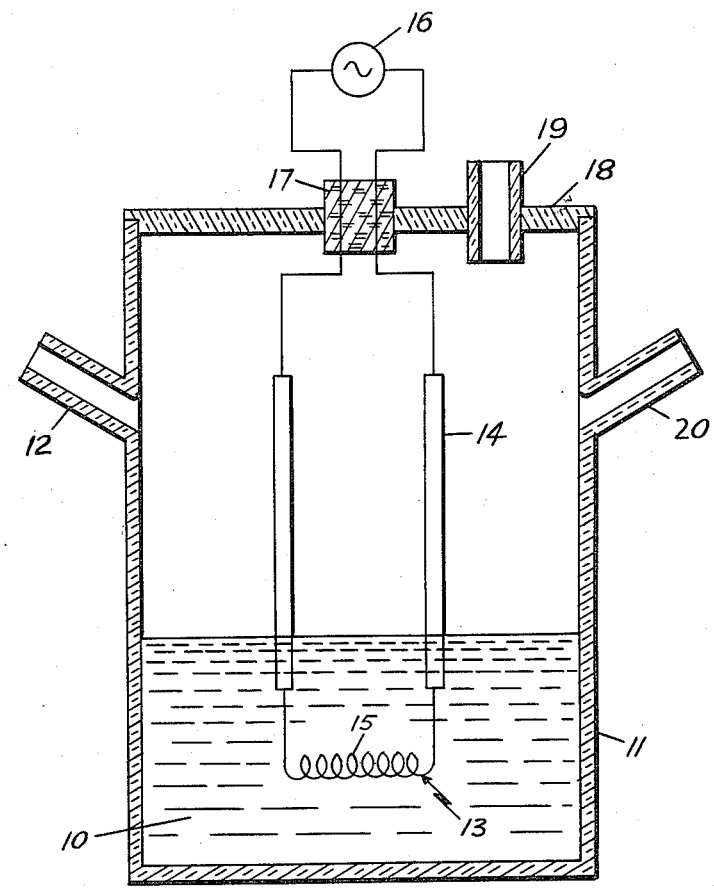

2,944,874

PREPARATION OF SILICON

John W. Irvine, Jr., Belmont, Mass., assignor to Raytheon Company, a corporation of Delaware Filed Dec. 14, 1956, Ser. No. 628,270

18 Claims. (Cl. 23—223.5)

This invention relates to the preparation of silicon, and in particular, to a film-boiling technique for obtaining silicon from a silane compound.

The growth of the semiconductor industry has stimulated the search for a practical method for obtaining silicon. The cost of producing silicon is a significant factor in the future growth of this industry, especially, in the adaptation of semiconductor devices to fields heretofore dominated by conductor devices.

Various techniques, other than the film-boiling technique described in this invention, have been employed to prepare silicon. Among the most important methods are the reduction of the halogenated silanes using zinc and hydrogen and the thermal decomposition of halogenated silanes under reduced pressure. This latter method will be discussed in greater detail because it is akin to the teachings contained in Patent No. 1,671,213 to Van Arkel and Hendrik de Boer, although distinct from the method of the present invention. Briefly, the teachings of said patent involves the thermal decomposition of a suitable zirconium, titanium, or hafnium halide gas in the vicinity of an electrically heated filament, which filament is placed in the vicinity of a source of said gas. The metal of the halide employed deposits on said filament as the vapor of the halide is decomposed in the region surrounding the filament.

The teachings of said patent have been adapted to the preparation of silicon from a suitable halide compound, but with rather poor success. One serious limitation of the method for preparing silicon is the small yield of silicon for a given quantity of electricity. It is believed that this is due to thermally decomposing a gas and the distance molecules of said gas have to traverse in order to continually replace decomposed gas by unreacted gas. In the present invention, a silane compound is converted into a liquid and a heatable filament, hereinafter referred to as a target, is immersed in said liquid. Said target is energized by suitable means to generate a vapor of the silane compound in the vicinity of said target and silicon from said vapor deposits on said target at a distinctly faster rate than that obtainable from the previous gaseous method. Silicon is recoverable from said target for other uses.

The objects and advantages aforementioned and others will be forthcoming in subsequent paragraphs and with reference being made to the accompanying drawing wherein a reactor is illustrated.

In accordance with the terminology employed herein, the silane compounds referred to herein are the "silane" compounds referred to on pages 586 through 588 in the table of "Physical Constants of Inorganic Compounds, Handbook of Chemistry and Physics 35th edition, 1953–1954, published by Chemical Rubber Company, Cleveland, Ohio.

In accordance with the present invention, a suitable quantity of a liquid silane compound 10, or a pre-liquefied silane compound by way of example, tetraiodosilane $SiI_4$, is introduced into a reactor 11 through an inlet 12 of the reactor. A suitable silane compound, described in more detail subsequently, may be a gas, solid or a liquid at room temperature and atmospheric pressure, but the only requirement is that it be expediently convertible to a liquid at a practical temperature, or pressure, or a combination of the two, and that provision be made to maintain said compound at its liquid state in said reactor. Thus, a quantity of tetraiodosilane is preheated to convert it from its normal solid state to a liquid and said liquid is introduced into said reactor.

A target 13, comprised of tungsten electrodes 14 hard-soldered to a tungsten filament 15, is immersed in said liquid 10 and connected to an alternating current source 16 through a tight fitting insulator 17, such as cork, mounted in an aperture in a removable lid 18 of the reactor. Current from the source heats the filament and imparts heat to the surrounding liquid. Additional quantities of the said material may be added to the liquid to increase the quantity of same in the reactor. In this instance, the target material is preferably one that can withstand temperatures in the neighborhood of 1400° C. at which temperature silicon melts, but the temperature requirements of the target will vary with the conditions and the particular silane compound selected for the preparation of silicon. The temperature requirements of the target may vary if said liquid is being maintained as a liquid by a temperature and a pressure other than that described herein. Additionally, the target is preferably a substance that does not readily react with the decomposition products of said liquid or evolve elements that would react with said decomposition products. It is realized that other substances may meet the requirements for the target and the heating of said target may be accomplished by other means than an alternating current source. An inert gas such as argon is preferably admitted at an inlet 19 in the lid to flush the interior of the reactor initially and to inhibit the reaction of silicon with oxygen thereafter.

When current is supplied to the target, to heat the target in the neighborhood of 300° C., a vapor of tetraiodosilane is generated and surrounds the vicinity of the target and, as the temperature of the liquid itself rises, iodine and tetraiodosilane gases are evolved. The flow of argon assists in propelling said gases out of the reactor at the outlet 20. In the neighborhood of 1400° C., silicon in said vapor forms on said target. It is apparent that, because of the proximity of unreacted liquid to the gas surrounding the target, said gas is continuously replenished from said liquid and silicon is continuously deposited.

The film-boiling technique is applicable to a wide range of silicon-bearing compounds or silanes. These silane compounds may be solids, liquids, or gases at room temperature and may be classified as inorganic compounds as outlined in the aforementioned table or some may be classified as the silicon-organic analogues of saturated hydrocarbons or halogenated hydrocarbons.

An empirical formula of the applicable silicon compounds is represented by the hypothetical compound $Si_A\ X_B\ Y_C\ Z_D$, in which $X_B$, $Y_C$ and $Z_D$ are the only elements dissimilar from silicon which are attached to the $Si_A$ atom, and where the symbols have the following significance:

$Si_A$=denotes the number of tetravalent silicon atoms in the compound; and $X_B$=denotes the number of hydrogen atoms in the compound. B may range from zero to $2(A+1)$, but X does not exist in the compound when B is zero; and $Y_C$=denotes the number of halogen atoms in the compound. C may range from zero to 2(A+1), but Y does not exist in the compound when C is zero; and $Z_D$=denotes the number of halogen atoms in the compound different from Y atoms. D may range from zero to 2(A+1)−C, but Z does not exist in the compound when D is zero.

In addition, the integral number of atoms of the compound $Si_A X_B Y_C Z_D$ obeys the following equation:

$$B+C+D=2(A+1)$$

Five groups of compounds derived from the empirical formula will illustrate the range of silane compounds that may be employed for the preparation of silicon by the film-boiling technique. They may be identified as follows:

(a) When C and D of the empirical formula are zero, $Si_A X_B$ identifies the hydrogen saturated silicon compounds including silane, disilane, trisilane, tetrasilane, etc. and may include unsaturated compounds having more than one silicon atom.

(b) When B and D of the empirical formula are zero, $Si_A Y_C$ identifies the halogen saturated silicon compounds of one or more silicon atoms including the tetrahalogen silanes, the hexahalogen disilanes, the octahalogen trisilanes, etc.

(c) When B and C of the empirical formula are zero, it is obvious that $Si_A Z_D$ identifies the same halogen saturated compounds referred to in (b) above, so that it is not classified as a group insofar as this discussion is concerned.

(d) When D is zero, but B and C are other than zero, $Si_A X_B Y_C$ identifies the substituted halogenated silane compounds of which the mono, di, and trihalogen compounds of a single silicon atom are exemplified by triodosilane, dibromosilane, and chlorosilane, Additionally, are included the halogen substituted and monovalent substituted elements of compounds having more than one silicon atom that can be synthesized and which can be liquids at a practical temperature or pressure, or a combination of both, to employ the film-boiling technique described herein.

(e) When B is zero, but C and D are other than zero, $Si_A Y_C Z_D$ identifies the substituted dissimilar halogen compounds including the mono, di, and trihalogen forms of single silicon atoms such as bromotrichlorosilane, dibromodichlorosilane, trichloroiodosilane, etc. Additionally are included the halogen substituted compounds having more than one silicon atom that can be synthesized.

(f) When B, C and D are not zero, $Si_A X_B Y_C Z_D$ identifies the partially substituted dissimilar halogen compounds of saturated and unsaturated silanes which exist readily or that can be synthesized for adaptation to the film-boiling technique described herein.

Having described the method for preparing silicon by a film-boiling technique and the groups of compound from which silicon can be deposited, it is desired that the appended claims be given an interpretation commensurate with the principles described herein.

What is claimed is:

1. The method of preparing silicon comprising the steps of immersing a target in a liquid silane compound, heating said target to a temperature above the boiling point of said compound to convert said liquid to a gas substantially only in the immediate vicinity of said target while maintaining the remainder of said silane compound in a liquid state, and continuing to heat said target to cause molten silicon to form from said gas and deposit on said target.

2. The method of preparing silicon comprising the steps of converting a silane compound to a liquid, immersing a target in said liquid, heating said target to a temperature above the boiling point of said compound to convert said liquid to a gas substantially only in the immediate vicinity of said target, and continuing to heat said target to cause molten silicon to form from said gas and deposit on said target.

3. The method of preparing silicon comprising the steps of immersing a target in a liquid silane compound, said compound consisting of a plurality of similar elements from the halogen group attached to a silicon atom, heating said target to a temperature above the boiling point of said compound to convert said liquid to a gas substantially only in the immediate vicinity of said target while maintaining the remainder of said silane compound in a liquid state, and continuing to heat said target to cause molten silicon to form from said gas and deposit on said target.

4. The method of preparing silicon comprising the steps of immersing a target in a liquid silane compound, said compound consisting of a plurality of atoms of similar elements from the halogen group attached to a plurality of silicon atoms, heating said target to a temperature above the boiling point of said compound to convert said liquid to a gas substantially only in the immediate vicinity of said target while maintaining the remainder of said silane compound in a liquid state, and continuing to heat said target to cause molten silicon to form from said gas and deposit on said target.

5. The method of preparing silicon comprising the steps of immersing a target in a liquid silane compound, said compound consisting of a plurality of atoms of dissimilar elements of the halogen group attached to a silicon atom, heating said target to a temperature above the boiling point of said compound to convert said liquid to a gas substantially only in the immediate vicinity of said target while maintaining the remainder of said silane compound in a liquid state, and continuing to heat said target to cause molten silicon to form from said gas and deposit on said target.

6. The method of preparing silicon comprising the steps of immersing a target in a liquid silane compound, said compound consisting of a plurality of atoms of dissimilar elements of the halogen group attached to a plurality of silicon atoms, heating said target to a temperature above the boiling point of said compound to convert said liquid to a gas substantially only in the immediate vicinity of said target while maintaining the remainder of said silane compound in a liquid state, and continuing to heat said target to cause molten silicon to form from said gas and deposit on said target.

7. The method of preparing silicon comprising the steps of immersing a target in a liquid silane compound, said compound consisting of a plurality of hydrogen atoms attached to a silicon atom, heating said target to a temperature above the boiling point of said compound to convert said liquid to a gas substantially only in the immediate vicinity of said target while maintaining the remainder of said silane compound in a liquid state, and continuing to heat said target to cause molten silicon to form from said gas and deposit on said target.

8. The method of preparing silicon comprising the steps of immersing a target in a liquid silane compound, said compound consisting of a plurality of hydrogen atoms attached to a plurality of silicon atoms, heating said target to a temperature above the boiling point of said compound to convert said liquid to a gas substantially only in the immediate vicinity of said target while maintaining the remainder of said silane compound in a liquid state, and continuing to heat said target to cause molten silicon to form from said gas and deposit on said target.

9. The method of preparing silicon comprising the steps of immersing a target in a liquid silane compound, said compound consisting of at least one hydrogen atom and a plurality of atoms of similar elements from the halogen group attached to a silicon atom, heating said target to a temperature above the boiling point of said compound to convert said liquid to a gas substantially only in the immediate vicinity of said target while maintaining the remainder of said silane compound in a liquid state, and continuing to heat said target to cause molten silicon to form from said gas and deposit on said target.

10. The method of preparing silicon comprising the steps of immersing a target in a liquid silane compound, said compound consisting of at least one hydrogen atom and a plurality of atoms of dissimilar elements of the halogen group attached to a silicon atom, heating said target to a temperature above the boiling point of said compound to convert said liquid to a gas substantially only in the immediate vicinity of said target while maintaining the remainder of said silane compound in a liquid state, and continuing to heat said target to cause molten silicon to form from said gas and deposit on said target.

11. The method of preparing silicon comprising the steps of immersing a target in a liquid silane compound, said compound consisting of a plurality of hydrogen atoms and a plurality of atoms of similar elements from the halogen group attached to a silicon atom, heating said target to a temperature above the boiling point of said compound to convert said liquid to a gas substantially only in the immediate vicinity of said target while maintaining the remainder of said silane compound in a liquid state, and continuing to heat said target to cause molten silicon to form from said gas and deposit on said target.

12. The method of preparing silicon comprising the steps of immersing a target in a liquid silane compound, said compound consisting of a plurality of hydrogen atoms and dissimilar elements of the halogen group attached to a silicon atom, heating said target to a temperature above the boiling point of said compound to convert said liquid to a gas substantially only in the immediate vicinity of said target while maintaining the remainder of said silane compound in a liquid state, and continuing to heat said target to cause molten silicon to form from said gas and deposit on said target.

13. The method of preparing silicon comprising the steps of immersing a target in a liquid silane compound, said compound consisting of at least one hydrogen atom and a plurality of atoms of similar elements from the halogen group attached to a plurality of silicon atoms, heating said target to a temperature above the boiling point of said compound to convert said liquid to a gas substantially only in the immediate vicinity of said target while maintaining the remainder of said silane compound in a liquid state, and continuing to heat said target to cause molten silicon to form from said gas and deposit on said target.

14. The method of preparing silicon comprising the steps of immersing a target in a liquid silane compound, said compound consisting of at least one hydrogen atom and a plurality of atoms of disimilar elements of the halogen group attached to a plurality of silicon atoms, heating said target to a temperature above the boiling point of said compound to convert said liquid to a gas substantially only in the immediate vicinity of said target while maintaining the remainder of said silane compound in a liquid state, and continuing to heat said target to cause molten silicon to form from said gas and deposit on said target.

15. The method of preparing substantially pure elemental silicon comprising the steps of immersing a target in a liquid silane compound, heating said target in a substantially oxygen-free environment to a temperature above the boiling point of said compound to convert said liquid to a gas substantially only in the immediate vicinity of said target while maintaining the remainder of said silane compound in a liquid state, and continuing to heat said target to cause molten silicon to form from said gas and deposit on said target.

16. The method of preparing substantially pure elemental silicon comprising the steps of immersing a target in a liquid silane compound, heating said target in an inert gaseous environment to a temperature above the boiling point of said compound to convert said liquid to a gas substantially only in the immediate vicinity of said target while maintaining the remainder of said silane compound in a liquid state, and continuing to heat said target to cause molten silicon to form from said gas and deposit on said target.

17. The method of preparing substantially pure elemental silicon comprising the steps of immersing a target in a liquid silane compound, heating said target to a temperature above the boiling point of said compound to convert said liquid to a gas substantially only in the immediate vicinity of said target while maintaining the remainder of said silane compound in a liquid state, continuing to heat said target to cause molten silicon to form from said gas, dispelling any gaseous elements generated from the decomposition of said compound and collecting silicon formed thereby.

18. The method of preparing silicon comprising the steps of immersing a target in a liquid silane compound, said compound consisting of a silicon atom having elements attached thereto selected from the group consisting of hydrogen and the halogens, heating said target to a temperature above the boiling point of said compound to vaporize said compound substantially only in the immediate vicinity of said target, and continuing to heat said target to cause molten silicon to form on said target from said vapor while maintaining the remainder of said compound in a liquid state.

References Cited in the file of this patent

UNITED STATES PATENTS 2,706,153   Glasser _____ Apr. 12, 1956

OTHER REFERENCES

Parravano et al., Chemical Abstracts, vol. 17 (1923), p. 3651.

Fiat Final Report 789, "Experiments to Produce Ductile Silicon," Smatko, April 1946, pages 1–5.

Litton et al.: "High Purity Silicon," J. Electro-Chem. Soc., June 1954, vol. 101, No. 6 pp. 287–292.